(12) United States Patent
Christensen et al.

(10) Patent No.: US 6,576,158 B1
(45) Date of Patent: Jun. 10, 2003

(54) SYNTHESIS GAS PRODUCTION BY STEAM REFORMING

(75) Inventors: Peter Seier Christensen, Copenhagen (DK); Tommy Hansen, Tikøb (DK); Viggo Lucassen Hansen, Brønshøj (DK); Lars Ejby Andersen, Helsingør (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 09/577,600

(22) Filed: May 25, 2000

Related U.S. Application Data

(60) Provisional application No. 60/136,398, filed on May 27, 1999.

(51) Int. Cl.[7] ............................... C07C 1/02; C10K 1/02
(52) U.S. Cl. ..................... 252/373; 423/652; 423/418.2
(58) Field of Search ............................. 423/652, 418.2; 252/373; 228/182

(56) References Cited

U.S. PATENT DOCUMENTS

| 4,707,351 | A | * | 11/1987 | Lord et al. .............. 423/648 R |
| 5,039,510 | A | * | 8/1991 | Pinto .......................... 423/652 |
| 5,718,881 | A | * | 2/1998 | Sederquist et al. ......... 423/652 |
| 6,197,365 | B1 | * | 3/2001 | Bachinger et al. .......... 427/115 |

FOREIGN PATENT DOCUMENTS

| EP | 0855366 | 7/1998 |
| JP | 59205332 | 11/1984 |

* cited by examiner

Primary Examiner—Stanley S. Silverman
Assistant Examiner—Edward M. Johnson
(74) Attorney, Agent, or Firm—Dickstein Shapiro Morin & Oshinsky, LLP

(57) ABSTRACT

A process for the preparation of hydrogen and carbon monoxide rich gas by steam reforming of a hydrocarbon feedstock in the presence of a steam reforming catalyst disposed in the pores of a porous supporting structure aligned and adhered along the wall of a reforming reactor.

13 Claims, 2 Drawing Sheets

SYNTHESIS GAS PRODUCTION BY STEAM REFORMING

This application claims the benefit of U.S. Provisional Application No. 60/136,398, filed May 27, 1999.

The present invention is directed to catalytic steam reforming of a hydrocarbon feed stock by contact with catalysed hardware.

BACKGROUND OF INVENTION

The term "catalysed hardware" as used herein refers to a catalyst system, where a layer of catalyst is placed on a surface of another material, e.g. a metal. The term porous structure stabilised catalysed hardware refers to a catalyst system, where a porous structure made from a material, which is stronger than the catalyst, is adhered to the other material and the catalyst is deposited in the cavities of the porous structure. In the remaining part of the description the porous structure is considered to be made from metal. However, any porous material, which is stronger than the catalytic material, can be used.

State of the art steam reforming technology makes use of reforming catalysts in form of pellets of various sizes and shapes. The catalyst pellets are placed in fixed bed reactors or reformer tubes. The overall steam reforming reaction is endothermic. The necessary heat is supplied from the environment outside the tubes.

Use of reformer tubes with catalysed hardware steam reforming catalysts on inner tube wall of a steam reforming reactor is disclosed in EP Patent Application No. 855,366. The main advantages of utilising catalysed hardware in the steam reforming process are:

a. Improved heat transport from the heat source outside the reformer tube to the catalyst because of the direct conduction of heat from the inner tube wall to the catalyst;
b. Reduced tube temperature resulting in increased lifetime and/or reduced tube material consumption;
c. Increased catalyst temperature resulting in increased catalyst activity, increased hydrocarbon conversion and reduced catalyst amount; and
d. Reduced pressure drop.

A general problem with catalysed hardware for use in steam reforming is to establish sufficient adhesive strength of the catalyst to the reactor wall, and at the same time retain the necessary properties of the catalyst with respect to catalytic activity, pore structure, sintering stability etc.

SUMMARY OF THE INVENTION

The object of the present invention is to provide catalysed hardware having improved adhesion stability together with required properties of catalytic performance in steam reforming processes.

In accordance with the above object, this invention is a process for the preparation of hydrogen and carbon monoxide rich gas by steam reforming of a hydrocarbon feedstock in the presence of a steam reforming catalyst having a porous supporting structure and being adhered to wall of a reforming reactor, wherein the steam reforming catalyst is deposited in the supporting porous structure.

Porous metal structures have improved adhesion to a metallic reactor wall. The catalyst is deposited within the porous metal structure and is retained in the structure, which reduces or even eliminates the requirement of adhesion of the catalyst to the reactor wall.

When practising the invention any type of metallic porous structure being able to withstand the actual process conditions used in the steam reforming process may be used, including metal foam, metal net, expanded metal, sinter metal and metal gauze. The requirement to the adhesion of the catalyst depends on the type of porous metal selected.

Foamed metal has a structure, where cavities of pores are substantially spherical and the openings of the cavities have a smaller radius than the radius of the spherical cavities. Catalytic material being deposited in the cavities cannot escape from the cavities. Adhesion of the catalyst to the metal is therefore not required.

The catalyst can be deposited in the cavities e.g. by intrusion of slurry containing a ceramic precursor into the metal foam, followed by drying, calcination, and impregnation of the active catalytic material.

If a porous metal structure is selected, in which the catalyst is not retained by the physical surface of the structure, the required adhesive strength of the catalyst to the metal is still reduced. Due to the increased catalyst/metal interface surface area the adhesive strength per unit area is lower in order to provide the same overall adhesive strength.

Attrition loss of the catalyst is advantageously reduced since the catalyst is protected by the metal structure when in contact with gas inevitably containing particles flowing along the reactors inner surface.

The risk of catalyst flaking off from the reactor wall due to e.g. thermal stress is considerably reduced.

Use of metal foam provided with a catalyst adhered to wall of a reactor vessel is disclosed in Japanese Patent Application No JP 59-205332(A) for the production of olefins from hydrocarbon feed stock. The purpose of this catalyst is to eliminate risk of coke formation when producing olefins with internal heat pyrolysis of heavy oil by using a catalyst lyst a cracking function for heavy substances. The above patent publication is completely silent about the procedure by which the catalyst containing foam is attached to the reactor vessel.

The porous structure for use in the inventive process is in a first step attached to the wall of the reaction vessel. Subsequently, the catalyst is dispersed in the porous structure.

The advantages of using catalysed hardware for steam reforming described above are in particular related to steam reforming processes and in general to endothermic processes being heated by external heat supply.

The porous metal can be adhered to the reactor wall by e.g. soldering or diffusion bonding.

The preparation step in which the porous metal is adhered to the reactor wall requires heating of the reactor and the porous metal to a temperature above the maximum operating temperature of the reactor. This is necessary to provide sufficient adhesion strength at the maximum operating temperature of the reactor.

When soldering is applied, the soldering temperature must be at least 100–150° C. higher than the maximum operating temperature.

The catalyst can be arranged in the porous structure by means of e.g. spraying, painting or dipping into a slurry containing a ceramic precursor. Thereafter, the slurry is dried and calcined. Finally, the ceramic layer thus obtained is impregnated with the catalytic active material. Alternatively, the catalytic active material is applied simultaneously with the ceramic precursor.

Figure 1:
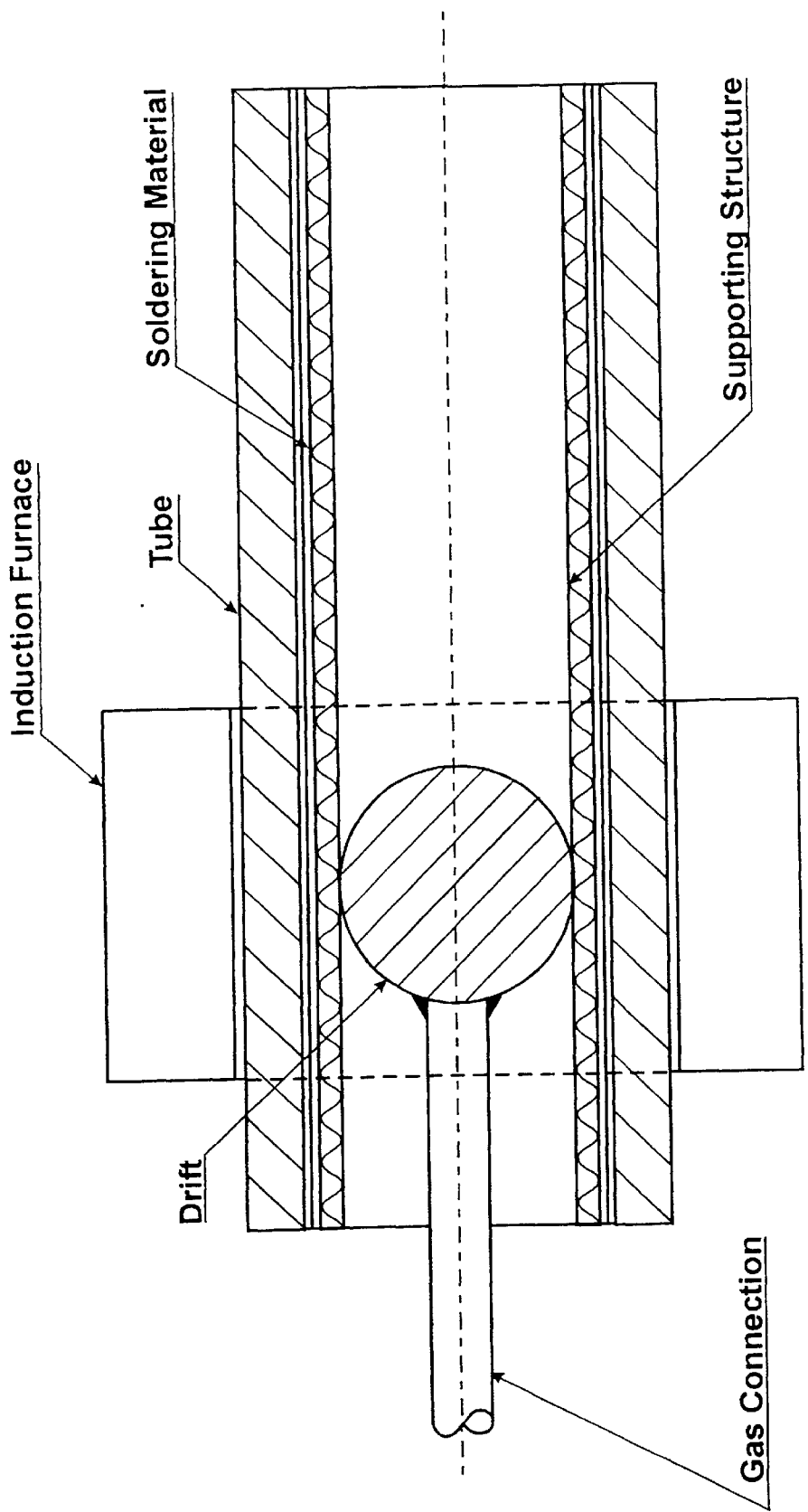
FIG. 1 shows a process step of the present invention in which a drift or sphere is used to press the porous metal against the tube walls.

In a specific embodiment of the invention the porous structure is adhered to the wall of a reforming reactor by the following procedure:

A porous metal structure is, after appropriate pre-treatment of the supporting material and tube, placed in a reactor tube together with the soldering material. The tube is mounted in an induction furnace, so that a section of the tube is heated above the soldering temperature. A drift or a sphere is used to press the porous metal against the tube wall in the soldering zone in order to ensure contact to the tube wall, as schematically shown in FIG. 1 in the attached drawings. The heating zone and the drift are moved along the tube length to obtain soldering of the supporting material along the entire length of the tube.

This invention can also be used for other shapes than circular tubes by using an appropriately shaped drift.

Figure 2:
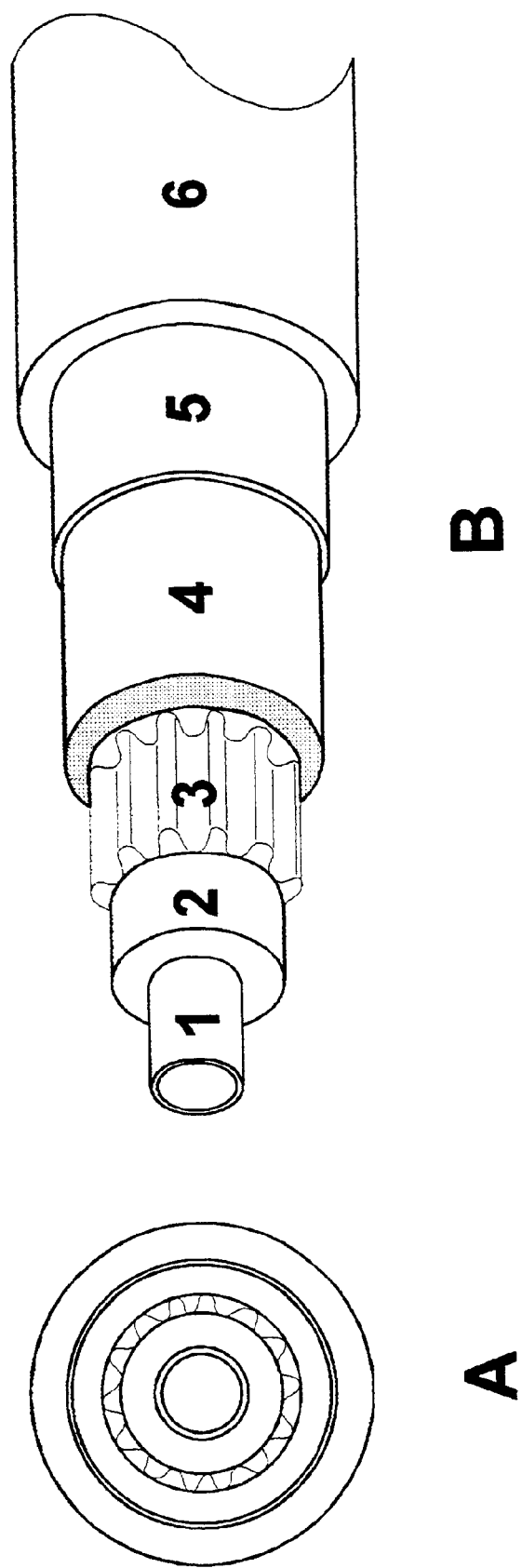
FIG. 2 shows a set-up for a further method to adhere the porous metal to the wall of the performing reactor in accordance with the present invention.

A set-up for a further method to adhere the porous metal to the wall of a reforming reactor is shown schematically in FIGS. 2a and 2b. FIG. 2a shows the set-up seen from the end; FIG. 2b shows an exploded view. The porous metal structure 4 is after appropriate pre-treatment of the supporting material and tube, placed in the tube 6 together with the soldering material 5. Inside the tube is mounted a second smaller tube or rod 1. In the annular space between the inner and outer tube is placed a material 2, which expands at high temperature. A spacer 3 is placed to avoid contact between 2 and 4. The tube is placed in a furnace and heated to the soldering temperature. The expanded material forces the porous metal structure against the tube wall to ensure contact to the tube wall. A useful expanding material 2 is Interam®, a product obtainable from 3M Inc.

In both methods the catalyst is subsequently dispersed in the porous structure. The advantages of using catalysed hardware for steam reforming described above are in particular related to steam reforming processes and in general to endothermic processes being heated by external heat supply.

What is claimed is:

1. A process for the preparation of hydrogen and carbon monoxide rich gas comprising:
    lining the interior wall of a reforming reactor with a porous metallic structure;
    adhering the porous metallic structure to the interior wall of the reforming reactor;
    providing a ceramic carrier material into the porous metallic structure;
    incorporating a steam reforming catalytically active material into the ceramic carrier material; and
    steam reforming a hydrocarbon feedstock in the presence of the steam reforming catalytically active material by passing the feedstock through the reforming reactor lined with the porous metallic structure having the ceramic carrier material provided therein and the steam reforming catalytically active material impregnated into the ceramic carrier material.

2. The process according to claim 1, wherein the porous metallic structure is a foamed metal, metal net, expanded metal, sinter metal or a metal gauze.

3. The process according to claim 2, wherein the porous metallic structure is foamed metal.

4. The process according to claim 1, wherein the reforming reactor is a tube.

5. The process according to claim 1,
    wherein lining the interior wall of the reactor comprises
        placing the porous metallic structure into the reforming reactor with soldering material disposed between the porous metallic structure and the reforming reactor; and
    wherein adhering the porous metallic structure to the interior wall of the reactor comprises
        mounting the reactor in an induction furnace,
        inserting a drift inside the porous metallic structure inside the reactor,
        heating a section of the reactor by the induction furnace to a temperature above a predetermined soldering temperature, such that the drift is located inside the section of the reactor being heated by the induction furnace, and
        moving the drift and the induction furnace along the length of the reactor, to thereby obtain soldering of the porous metallic structure to the reforming reactor by the application of pressure by the drift to press the porous metallic structure against the reactor while the soldering material at the heated section is in a melted state.

6. The process according to claim 5, wherein the induction furnace heats the soldering material inside the reactor to a temperature which is at least 100–150° C. higher than a predetermined maximum operating temperature of the steam reforming process to be performed in the reactor.

7. The process according to claim 1, further comprising the step of, prior to lining the reactor with the porous metallic structure, pre-treating the reactor and the porous metallic structure to provide sufficient adhesion strength at the maximum operating temperature of the steam reforming process to be performed in the reactor.

8. The process according to claim 1,
    wherein lining the reactor comprises
        placing the porous metallic structure into the reforming reactor with soldering material disposed between the porous metallic structure and the reforming reactor; and
    wherein adhering the porous metallic structure to the interior wall of the reactor comprises
        mounting a tube or rod, which has an exterior diameter substantially smaller than that of the inner diameter of the porous metallic structure placed in the reforming reactor, inside the porous metallic structure,
        placing, in an annular space between the exterior diameter of the tube or rod and the inner diameter of the porous metallic structure located in the reactor, a material which expands at a high temperature,
        placing a spacer between the material which expands at a high temperature and the porous metallic structure,
        placing the reactor in a furnace, and
        heating the reactor to a predetermined soldering temperature so that the material which expands at a high temperature expands and forces the porous metallic structure against the interior wall of the reforming reactor.

9. The process according to claim 8, wherein the furnace heats the soldering material inside the reactor to a temperature which is at least 100–150° C. higher than a predetermined maximum operating temperature of the steam reforming process to be performed in the reactor.

10. The process according to claim 1, wherein the ceramic carrier material is provided into the porous metallic structure by spraying, painting or dipping the porous metallic structure into a slurry containing a ceramic precursor, and then drying and calcining the slurry.

11. The process according to claim 10, wherein the ceramic carrier material is provided into the porous metallic structure by painting the slurry onto the porous metallic structure, and then drying and calcining the slurry.

12. The process according to claim 10, wherein the catalytically active material is impregnated into the ceramic carrier material after calcining the ceramic precursor slurry.

13. The process according to claim 10, wherein the catalytically active material is applied to the porous metallic structure simultaneously with the ceramic precursor.

* * * * *